United States Patent Office 2,827,824
Patented Mar. 25, 1958

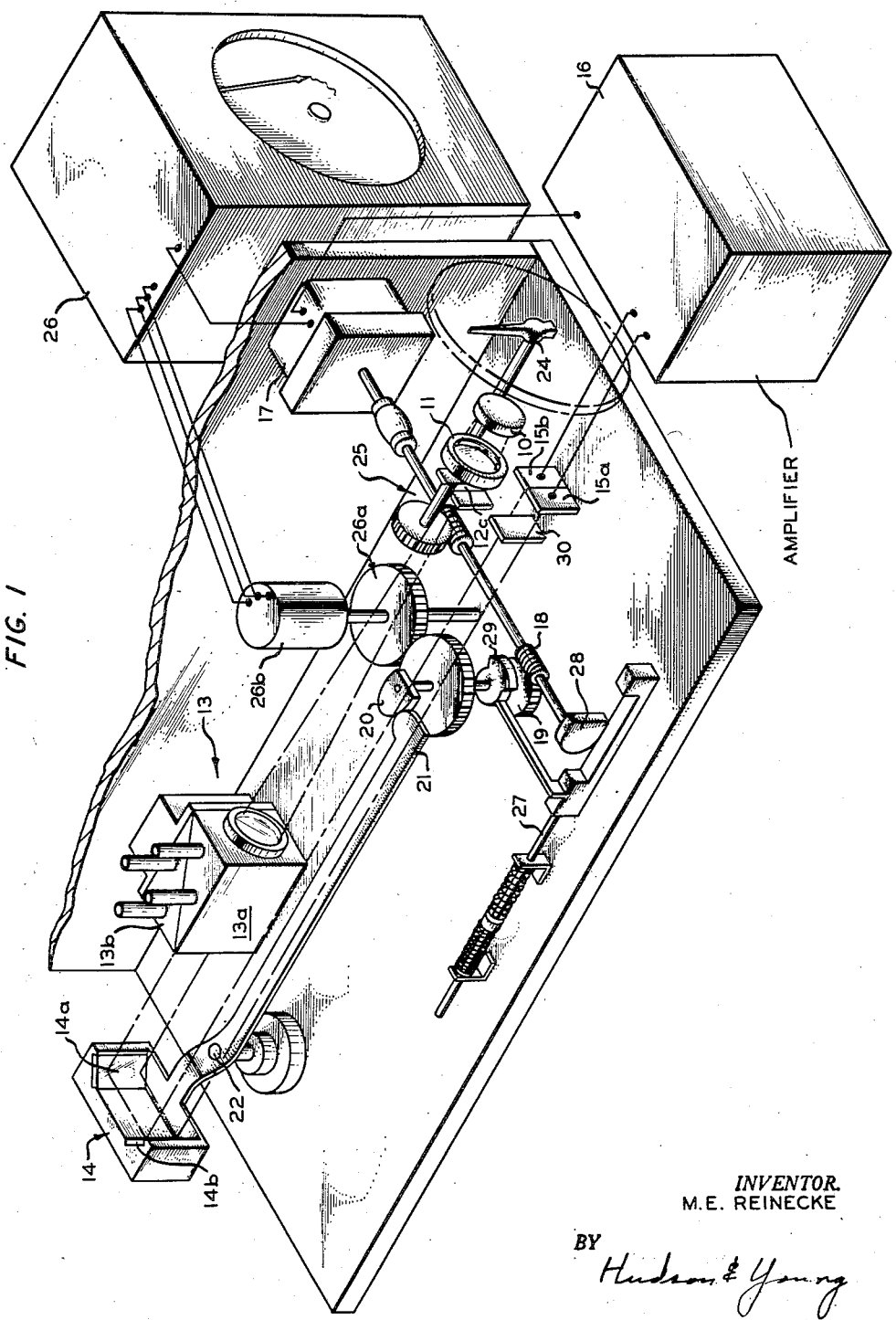

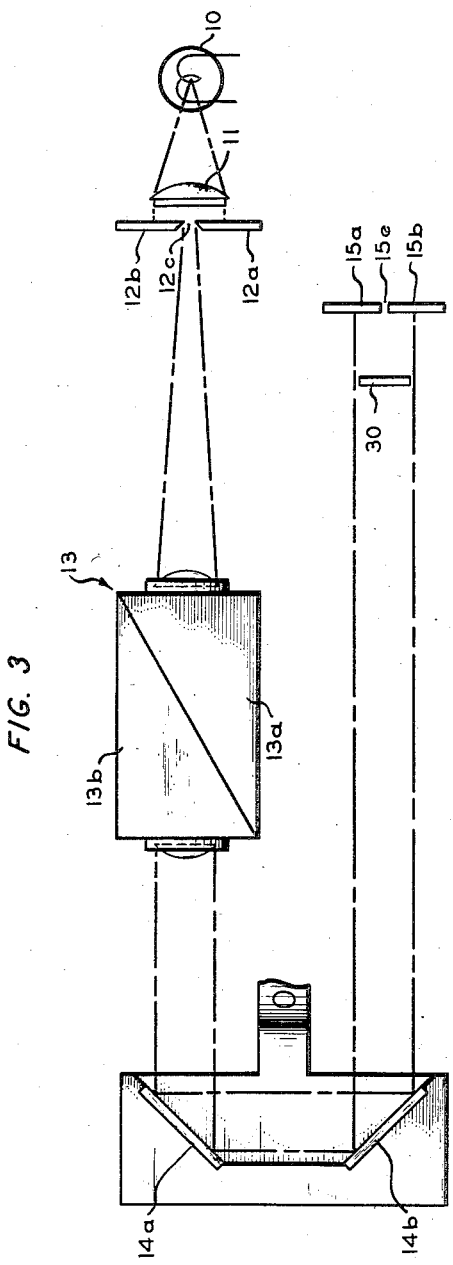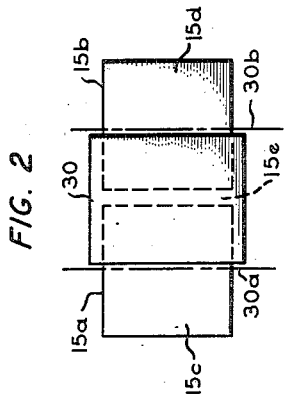

2,827,824

PHOTOMETRIC RADIATION ANALYZERS

Marvin E. Reinecke, Bartlesville, Okla., assignor to Phillips Petroleum Company, a corporation of Delaware Application January 17, 1955, Serial No. 482,274

2 Claims. (Cl. 88—14)

This invention relates to radiation analyzers, particularly those utilizing a beam of radiation directed upon a plurality of radiation-sensitive surfaces. In another aspect, the invention relates to a differential refractometer of improved construction.

In the copending application of F. W. Crawford, Serial No. 187,600, filed September 29, 1950, now Patent 2,724,304, granted November 22, 1955, entitled, "Differential Refractometer," there is disclosed an instrument wherein a beam of radiation is directed upon a pair of radiation-sensitive devices or detectors, and the radiation beam is deflected in accordance with the difference between the refractive index of a sample fluid and the refractive index of a standard fluid.

As the sample fluid changes composition, a deflection of the beam is produced which changes the relative amounts of radiation incident upon the two sensitive devices. By comparison of the signals from these sensitive devices, an output is obtained which is representative of the composition of the sample fluid. If desired, the output can be utilized to drive a servomotor which deflects the beam in a direction opposite to the direction of deflection caused by the change in composition of the sample, this mechanism operating until the detector circuit is restored to a predetermined or balanced condition. In this case, the position of the servomotor shaft is representative of the sample composition.

In accordance with this invention, the sensitivity of the described instrument is improved by interposing an opaque barrier in the path of the radiation beam such that the radiation normally impinging upon the area between the detectors is blocked out, as is the radiation directed at the portion of the sensitive surfaces of the detectors adjacent this intermediate region. This has two important advantages. First, a broad beam of radiation can be used, thus obviating the necessity for using several focusing devices in the optical system. Second, the higher beam intensity in a narrow band produces a proportionately higher output in the detector when the beam is deflected.

The provision of an opaque barrier of the character stated is extremely useful in differential refractometers of the type disclosed in the aforementioned Crawford application, and is also generally applicable to radiation analyzers of any type wherein the radiation beam is deflected and caused to fall upon a plurality of radiation-sensitive devices.

Accordingly, it is an object of the invention to provide an improved optical system for instruments utilizing radiation.

It is a further object to provide a differential refractometer of improved construction.

It is a still further object to provide a differential refractometer which is of low cost, utilizes a minimum number of standard components and is accurate and reliable in operation.

Various other objects, advantages and features of the invention will become apparent from the following detailed description taken in conjunction with the accompanying drawings, in which:

Figure 1 is a perspective view of a differential refractometer constructed in accordance with the invention;

Figure 2 is a detail drawing illustrating a feature of the invention; and

Figure 3 is a top view of the optical system, on an enlarged scale.

Referring now to the drawings in detail, I have shown a radiation source 10, such as the filament of an incandescent lamp, the radiation from this source being thrown by a lens 11 upon a pair of members 12a, 12b, which define a wide slit 12c. By the action of the slit 12c, a broad beam of radiation is produced which passes through cells 13a and 13b of an assembly 13 and, thence, is reflected by mirrors or prisms 14a, 14b onto a pair of radiation detector units 15a and 15b. Where the optical system of the invention is utilized in a differential refractometer, cell 13a can contain a sample of fluid to be analyzed while cell 13b can contain a standard fluid. In passing through the assembly 13, therefore, the beam is deviated or deflected to an extent which is proportional to the difference in indices of refraction of the standard fluid and test fluid. As the composition of the sample fluid changes, the deflection of the radiation beam changes in a corresponding manner and varies the relative amounts of radiation falling upon the detectors 15a, 15b which, in the example shown, are photoelectric cells.

Preferably and advantageously, the outputs of the cells 15a, 15b are fed, in opposition, to an amplifier 16, Figure 1. When the output of the detectors is equal or, if desired, in a predetermined ratio, the system is balanced and no output is produced by the amplifier. However, if the beam is deflected by a change in composition of the sample fluid, the system is no longer balanced and an output is produced by the amplifier 16 which drives a servomotor 17, the rotation of the motor shaft being communicated through a worm gear 18, a spur gear 19, a cam 20, and a cam follower 21 to an assembly 14 which carries the mirrors or prisms 14a and 14b. It will be observed that the assembly 14 is rotatable about a pivot 22 so that, by the action of the motor 17, the assembly 14 is rotated until a balanced condition is again obtained. The amount of rotation of the motor 17 necessary to restore the system to a balanced condition is proportional to the difference in refractive indices of the standard and sample fluids and, hence, representative of the composition of the sample fluid which is, therefore, indicated directly by the position of the shaft of motor 17.

The composition is indicated directly by an indicator 24 connected by gearing 25 to the motor shaft, and the position of the motor shaft is further telemetered to a recorder 26 by gearing 26a and a potentiometer 26b.

Offscale movement is prevented by a stop device including a spring-loaded rod 27 cooperating with a cam 28 on the shaft of motor 17 and a cam 29 rotatable with the spur gear 19.

Referring now to Figures 2 and 3, it will be noted that the radiation detectors 15a, 15b are arranged in closely spaced formation and have radiation sensitive surfaces 15c and 15d of generally rectangular configuration, which are separated by a narrow intermediate slit or region 15e.

In accordance with the invention, a barrier 30 is positioned in the path of the radiation beam, this barrier being opaque to the radiation and disposed in fixed position upon the base of the instrument. This barrier intercepts the radiation which would normally fall upon the intermediate region 15e between the radiation detectors and also the radiation which would otherwise impinge upon the surfaces of the radiation-sensitive surfaces or elements adjacent this intermediate region 15e. In particular, where the radiation is in the form of a broad beam, as described, the barrier 30 blocks off the central part of the beam so that only narrow ribbons, indicated at 30a and 30b, actually impinge upon the radiation-sensitive elements. In the particular example shown, these narrow ribbons are, of course, of rectangular cross section and are incident upon an intermediate part of the two photoelectric cells. In one specific case, the sensitive surfaces of the photoelectric cells were hermetically sealed, each one being one-half inch wide. The barrier was slightly more than one-half inch wide so that the ribbons of radiation impinged upon the center of the cells.

It will be evident that the provision of this opaque barrier provides important advantages. First, if a narrow beam of radiation is used which would normally fall at a position within the slot 15e, some deflection of the beam would occur before it fell upon one or the other of the photoelectric cells 15a and there would, therefore, be an insensitive region or "dead space" where changes in composition of the sample would not affect the output of the instrument. Such an inactive zone is clearly avoided by provision of the barrier 30 and the utilization of a broad radiation beam.

Second, with the system balanced and a region of equal width at each side of the barrier 30, it is evident that substantially less radiation is incident upon the detectors than would be the case if a broad band were utilized and the barrier 30 omitted. The limitation of the total radiation falling upon the detectors, in many instances, permits them to be operated at a more sensitive and advantageous portion of their characteristic curve.

Finally, the sensitivity of the instrument is greatly increased because the higher beam intensity in a narrow band produces a proportionately higher output in the detector when the beam is deflected. The increase in sensitivity thus obtained is quite significant in practical operation of instruments of this type.

In a practical case, a 30–40% increase in sensitivity was obtained in a differential refractometer utilizing the opaque barrier of the invention. In this particular instrument, the ribbons of radiation which passed around the edges of the barrier were approximately 3/64" in width, and the light intensity was considerably greater than was provided where a prism was used instead of the opaque barrier to cause the light to spread out over a large area of the photoelectric cells. Thus, by the present invention, an increased sensitivity and beam intensity were obtained at a considerably lower cost than in the corresponding system where a prism was used instead of the opaque barrier.

While the invention has been described in connection with present, preferred embodiments thereof, it is to be understood that this description is illustrative only and is not intended to limit the invention.

I claim:

1. In a photometric analyzer, in combination, a radiation source, a reflector, a detector unit having two radiation-sensitive devices arranged in closely spaced formation, a cell assembly comprising two cells each adapted to contain a fluid, means for directing radiation from said source through said cells to said reflector and, thence, to said radiation-sensitive devices, a circuit connecting the electrical outputs of said devices in opposition to produce a voltage representative of the difference in intensity of radiation incident upon said devices, a cam, a cam follower engageable with said cam and adapted to rotate said reflector, a motor for driving said cam, means for feeding said voltage to said motor, thereby to move said cam and said reflector until the radiation incident upon both devices is of equal intensity, a potentiometer having its contactor mechanically connected to said motor, means for producing a voltage drop across said potentiometer, means for recording the voltage existing between the potentiometer contactor and one fixed terminal thereof, and a fixed barrier of material opaque to said radiation mounted directly in front of said detector unit, as related to the radiation impinging thereon, said barrier intercepting the radiation directed at the area intermediate said radiation-sensitive devices and a portion of each device adjacent said intermediate area.

2. In a photometric analyzer, in combination, a radiation source, a reflector, a detector unit having two radiation-sensitive devices arranged in closely spaced formation, a cell assembly comprising two cells each adapted to contain a fluid, means for directing radiation from said source through said cells to said reflector and, thence, to said radiation-sensitive devices, a circuit connecting the electrical outputs of said devices in opposition to produce a voltage representative of the difference in intensity of radiation incident upon said devices, a cam, a cam follower engageable with said cam and adapted to rotate said reflector, a motor for driving said cam, means for feeding said voltage to said motor, thereby to move said cam and said reflector until the radiation incident upon both devices is of equal intensity, an indicating device connected to said motor to indicate the differences in refractive index between the fluids in said cells, and a fixed barrier of material opaque to said radiation mounted directly in front of said detector unit, as related to the radiation impinging thereon, said barrier intercepting the radiation directed at the area intermediate said radiation-sensitive devices and a portion of each device adjacent said intermediate area.

References Cited in the file of this patent

UNITED STATES PATENTS

| 2,065,365 | Doyle et al. | Dec. 22, 1936 |
| 2,413,208 | Barnes | Dec. 24, 1946 |
| 2,421,854 | Seaman | June 10, 1947 |
| 2,649,013 | Schnelle | Aug. 18, 1953 |